(12) United States Patent
Kawamura

(10) Patent No.: US 6,807,555 B2
(45) Date of Patent: Oct. 19, 2004

(54) MODULAR ARITHMETIC APPARATUS AND METHOD HAVING HIGH-SPEED BASE CONVERSION FUNCTION

(75) Inventor: Shinichi Kawamura, Kodaira (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/660,679

(22) Filed: Sep. 12, 2003

(65) Prior Publication Data

US 2004/0054706 A1 Mar. 18, 2004

Related U.S. Application Data

(62) Division of application No. 09/699,481, filed on Oct. 31, 2000, now Pat. No. 6,662,201.

(30) Foreign Application Priority Data

Nov. 1, 1999 (JP) .......................................... 11-310619

(51) Int. Cl.[7] ................................................ G06F 7/72
(52) U.S. Cl. ....................................................... 708/491
(58) Field of Search ......................................... 708/491

(56) References Cited

U.S. PATENT DOCUMENTS

| | | |
|---|---|---|
| 4,996,527 A | 2/1991 | Houk et al. |
| 5,050,120 A | 9/1991 | Houk |
| 5,107,451 A | 4/1992 | Houk |
| 5,987,487 A | 11/1999 | Welland |

OTHER PUBLICATIONS

Shinichi Kawamura, et al., "Cox–Rower Architecture for Fast Parallel Montgomery Multiplication," Lecture Notes in Computer Science, No. 1807, May 2000, pp. 523–538.
Karl C. Posch, et al., "Modulo Reduction in Residue Number Systems," IEEE Transactions on Paralell and Distributed Systems, vol. 6, No. 5, May 1995, pp. 449–454.
J. Schwemmein, et al., "RNS–Modulo Reduction Upon a Restricked Base Value Set and its Applicability to RSA Cryptography," Computers and Security, vol. 17, No. 7, 1998, pp. 637–650.
Jean–Claude Bajard, et al., "An RNS Montgomery Modular Multiplication Algorithm," IEEE Trans. On Computers, vol. 47, No. 7, pp. 1998, 766–776.
Pascal Paillier, "Low–Cost Double–Size Modular Exponentiation or How to Stretch Your Cryptoprocessor," Lecture Notes in Computer Science, No. 1560, 1999, pp. 223–234.

*Primary Examiner*—D. H. Malzahn
(74) *Attorney, Agent, or Firm*—Oblon, Spivak, McClelland, Maier & Neustadt, P.C.

(57) ABSTRACT

In a modular arithmetic apparatus including a plurality of product-sum circuits having a modular arithmetic function and parallelly arranged, and a correction term calculation unit for calculating a correction term to be used for modular arithmetic operation in the product-sum circuits, the correction term calculation unit sequentially calculates the correction term in units of bits, and each of the product-sum circuits sequentially reflects the correction term calculated by the correction term calculation unit and performs base conversion or base extension.

6 Claims, 6 Drawing Sheets

MODULAR ARITHMETIC APPARATUS AND METHOD HAVING HIGH-SPEED BASE CONVERSION FUNCTION

This Application is a Division of 09/699,481 filed Oct. 31, 2000, now U.S. Pat. No. 6,662,201.

CROSS-REFERENCE TO RELATED APPLICATIONS

This application is based upon and claims the benefit of priority from the prior Japanese Patent Application No. 11-310619, filed Nov. 1, 1999, the entire contents of which are incorporated herein by reference.

BACKGROUND OF THE INVENTION

The present invention relates to a modular arithmetic processing apparatus and method for performing an arithmetic operation of a large integer at a high speed by parallel processing on the basis of a residue number system.

As a method of executing an efficient arithmetic operation of a large integer, a modular arithmetic or residue number system is known. In the residue number system, a set of relatively small integers $\{a_1, a_2, \ldots, a_n\}$, which are relatively prime to each other, is prepared, and a large integer as an expression target is expressed by residues obtained by dividing the integer by these integers. This set of integers will be referred to as the base of the residue number system hereinafter. The number n of elements will be referred to as a base size.

For example, when a base $\{a_1, a_2, \ldots, a_n\}$ is given, an integer n is expressed by n residues $\{x_1, x_2, \ldots, x_n\}$ obtained by dividing the integer x by the base $a_i$ (i=1, 2, ..., n). If the number x is a positive integer smaller than a product $A (=a_1 a_2 \ldots a_n)$ of the base elements, the number x can be uniquely expressed modulo the product A of the base elements. In other words, the number x and its residue number system expression $\{x_1, x_2, \ldots, x_n\}$ are in a one-to-one correspondence.

In such residue number system expression, to calculate the product of two integers x and y, the product is obtained in units of elements, and then, residues are obtained by dividing the integers by a corresponding base $a_i$. In other words, generally, a product modulo the product A of base elements is obtained by calculating products modulo the corresponding base $a_i$ in units of elements. This also applies to addition and subtraction. For elements $x_i$ and $y_i$ corresponding to the base $a_i$, an addition or subtraction modulo $a_i$ is executed.

In the arithmetic operation using such a residue number system, a multiplication, addition, or subtraction is executed by arithmetic operation modulo bases independently corresponding to the elements. For example, when values within the word length of a computer are employed as a base, the arithmetic operation of a very large integer can be realized by repeating a single-precision arithmetic operation.

Since the single-precision arithmetic operations can be independently executed in units of bases, preparing a plurality of calculators allows parallel processing. For example, when the base size is n, n multipliers with a residue function are prepared and parallelly operated whereby multiplication modulo the product A of base elements can be completed within the same time as that for one multiplication with single-precision residue.

A current computer normally uses binary expression. Calculation of a large integer based on binary expression takes a processing time proportional to the total number of digits (or bit length) of the large integer because carry propagates from the LSB (Least Significant Bit) to the MSB (Most Significant Bit). This is disadvantageous in processing speed as compared to parallel processing using a residue number system.

On the other hand, the residue number system is known for a long time as a scheme of efficiently executing a multiplication, addition, or subtraction of a large integer relative to radix representation represented by binary expression because no carry between words occurs.

However, for a division or comparison between two numbers, a more efficient means than the radix representation has been unknown. For this reason, how to apply the residue number system in detail has not been known until 80s, although it is supposed that the residue number system is suitable to an application for executing arithmetic operation of a large integer at a high speed, like public key cryptography system.

Posch et al. have proposed a scheme of executing arithmetic operation of RSA cryptography of a public key cryptography system using the residue number system in "Modulo Reduction in Residue Number Systems" (IEEE Transaction on Parallel and Distributed Systems, Vol. 6, No. 5, May 1995, pp. 449–454) and "RNS-Modulo Reduction Upon a Restricted Base Value Set and its, Applicability to RSA Cryptography" (Computer & Security, Vol. 17, pp. 637–650, 1998).

In addition, Kornerup et al. have proposed a similar high-speed arithmetic scheme in "An RNS Montgomery Modular Multiplication Algorithm" (13th IEEE Symposium on Computer Arithmetic (Proceedings of ARITH13), IEEE Computer Society, pp. 234–239), and Paillier has proposed a similar scheme in "Low-Cost Double-Size Modular Exponentiation or How to Stretch Your Cryptoprocessor" (Springer-Verlag, Lecture Notes in Computer Science No. 1560 Public Key Cryptography (PKC '99), pp. 223–234).

The main reason why the residue number system is used for RSA cryptography is that this cryptography is constructed by repeating a residue multiplication of a very large integer with 200 decimal digits or more, and high-speed processing can be realized using the above-described characteristic of the residue number system, which allows high-speed multiplication and addition/subtraction.

A common point of the schemes of Posch et al., Kornerup et al., and Paillier is that the Montgomery algorithm is combined with the residue number system to avoid a division disadvantageous for the residue number system. As another common point of the three schemes, base conversion or base extension is executed in the course of processing to obtain a value that expresses an integer, which is expressed by a residue using a certain base, with another base. In any scheme, whether base conversion or base extension can be efficiency executed affects the efficiency of the entire processing.

Two terms "base conversion" and "base extension" are used here. Base conversion means that a value expressed by a given base is re-expressed using another base prime to the given base. Base extension means that a value expressed by a base with the size n is expressed by a base with a size (n+1), i.e., a base obtained by adding, to the original base, an integer that is prime to the original base, and the (n+1)th element at that time is obtained. With the base extension scheme, base conversion can be constituted by repeating the base extension n times. In realizing RSA cryptography using the residue number system, a scheme and apparatus for efficiently executing base conversion (or base extension) are necessary.

However, the above-described three base conversion schemes and the base conversion schemes that have been conventionally proposed are inefficient in some points, as will be described below.

In the scheme proposed by Posch et al., the base conversion scheme mentioned in the arithmetic operation of RSA cryptography may generate an error in the value after conversion when the value before conversion is smaller than a predetermined value. To avoid this, Posch et al. has proposed a procedure in which an appropriate offset is added to the input of base conversion processing to convert the input into a value that causes no error in base conversion processing, the conversion result is base-converted, and the effect of offset is removed from the obtained base conversion result. However, such pre-processing and post-processing for offset increase the entire arithmetic amount, resulting in low efficiency.

Additionally, since the scheme of Posch et al. considerably limits the size of the RSA cryptography key calculable by a given base and requires a multiplier to calculate a correction term necessary for base conversion, it is also disadvantageous in the area in circuitry and processing delay.

FIG. 5 is a block diagram showing the schematic arrangement of a modular arithmetic circuit used for the RSA cryptography arithmetic operation using the scheme of Posch et al.

A product-sum circuit 501 with a modular arithmetic function, RAM 521, and ROM 531 constitute one unit. N units having the same arrangement are parallelly arrayed. In this case, the base size is n, and each unit executes an arithmetic operation corresponding to a specific base. For example, each unit corresponds to each of n base elements of a base A and each of n base elements of a base B. For example, the product-sum circuit 501 executes an arithmetic operation corresponding to bases $a_1$ and $b_1$. Each of the n units is designed to execute an arithmetic operation of r bits. These units are connected to each other through an r-bit bus.

FIG. 6 shows the internal structure of each of the product-sum circuits 501 to 50n. A structure related to the unit represented by the product-sum circuit 501 will be described here for the descriptive convenience. Inputs are r-bit data represented by a and b and an r-bit data input from the ROM 531, which is input from the right side in FIG. 6. Referring to FIG. 6, the data a is the input from the RAM 521, and the data b is the input from the ROM 531. The data a and b are multiplied by a multiplier 601, and the result is supplied to an adder 602 on the output side. The adder 602 receives and adds the multiplication result and a feedback value from a register 604. The result from the adder 602 is supplied to a modular arithmetic section 603 and converted into a residue by division by the value set in a register 605. The value of the register 605 is denoted by $m_i$ which represents the base $a_1$ or $b_1$. N data sets equal to the base size are supplied to the inputs a and b. After all the n data are calculated, the calculation result is complete in the register 604. It is supplied to the RAM 521 through the r-bit bus.

Referring back to FIG. 5, the modular arithmetic circuit includes a correction term calculation unit 510 for correcting the calculation result in base conversion and a ROM 530 which is externally attached to the correction term calculation unit 510 to supply at least an n-word parameter to the correction term calculation unit 510.

The correction term calculation unit 510 proposed by Posch et al. is implemented by a product-sum circuit as shown in FIG. 7. In the circuit shown in FIG. 7, input r-bit data and data input from the ROM 530 are multiplied by a multiplier 701 and then cumulatively added by an adder 702. The sum is stored in a register 703. The value is fed back after the correction term is completely calculated.

Note that the circuit scale of the correction term calculation unit 510 is as large as that of the product-sum circuit with a modular arithmetic function shown in FIG. 6. In addition, the correction term calculated here has a size of about (r+log$_2$n) bits. Referring to FIG. 6, the transmission bus width for transmitting the correction term to the product-sum circuits 501 to 50n is not r bits but (r+log$_2$n) bits, causing an increase in circuit area. Of these bits, r bits can be shared as the bus for the RAM to the correction term calculation unit. Even in this case, however, an extra area is required for log$_2$n bits for feedback.

Furthermore, the product-sum circuits 501 to 50n must execute the modular arithmetic operation at least once to reflect the correction term received from the correction term calculation unit 510 to the previous calculation result. The processing time may be saved if the correction term can be sequentially fed back to the product-sum circuits during other processes. However, in the implementation of Posch et al., the value cannot be fed back until the correction term is completely calculated. No means for solving these detailed problems has been proposed.

Another prior-art scheme of Kornerup et al. uses a scheme proposed in Shenoy and Kumaresan "Fast Base Extension Using a Redundant Modulus in RNS" (IEEE Transaction on Computers, Vol. 38, No. 2, February 1989, pp. 292–297) to calculate the correction term. In this case, the size of correction term is n, i.e., much smaller than that of the scheme of Posch et al. However, this scheme also requires a multiplication for correction term calculation, and a correction term arithmetic procedure efficient in circuit scale and processing delay has been demanded.

Still another prior-art scheme proposed by Paillier has a limited application range because of conditions that an arbitrary base cannot be selected, and conversion from a base to radix representation or conversion from radix representation to residue number system representation can be very efficiently executed. As an applicable example, only a case wherein two bases each having the base size n of 2 are used is described in detail in this paper, and other practical examples are unknown. When the base size n is as small as 2, each base element conversely becomes large, and this makes it difficult to increase the processing speed as compared to a case wherein the base size n can be set large, and each base element can be set small.

As described above, three schemes are known, which propose use of the residue number system aiming at high-speed processing of RSA cryptography are known. Although these schemes can improve the processing efficiency relative to conventionally proposed RSA cryptography arithmetic schemes, they are poor in base conversion processing efficiency as the most important part of the processing step or can use only a limited base size.

BRIEF SUMMARY OF THE INVENTION

The present invention has been made in consideration of the above situation, and has as its object to provide a new base conversion scheme better than the conventionally proposed base conversion schemes in some or all of the following points.

(a) The value of a correction term is relatively small and can be sequentially processed.

(b) The value after conversion matches the value expressed before conversion and has no error.

(c) Even if an error occurs, it can easily be controlled by pre- and post-processing or limitation on the input size.

(d) In an application to RSA cryptography, limitations on the key size are small.

(e) No multiplication is required to calculate the correction term, and the processing efficiency is high.

(f) The manner bases are set is not so constrained, and the versatility is high.

It is another object of the present invention to implement a high-speed modular arithmetic apparatus and method used for RSA cryptographic processing by combining the base conversion scheme with the Montgomery algorithm.

According to the present invention, there is provided a modular arithmetic apparatus comprising a plurality of product-sum circuits having a modular arithmetic function and parallelly arranged, and a correction term calculation unit for calculating a correction term to be used for modular arithmetic operation in the product-sum circuits, wherein the correction term calculation unit sequentially calculates the correction term in units of bits, and each of the product-sum circuits sequentially reflects the correction term calculated by the correction term calculation unit and performs base conversion or base extension. The product-sum circuit may be characterized by performing a Montgomery multiplication.

According to the present invention, there is also provided a modular arithmetic processing apparatus comprising a plurality of product-sum circuits parallelly arranged, and a correction term calculation unit for calculating a correction term to be used for modular arithmetic operation in the product-sum circuit, wherein the correction term calculation unit sequentially calculates the correction term in units of bits, and each of the product-sum circuits sequentially reflects the correction term calculated by the correction term calculation unit and converts a residue number system representation into a radix representation.

The correction term calculation unit may have a division circuit, and a base of a residue number system processed by the product-sum circuit may be a power of 2 or be approximated to a power of 2. The apparatus may further comprise a bit selection section for selecting an input bit to the correction term calculation unit. The apparatus may further comprise an I/O section for inputting/outputting data to/from an external unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
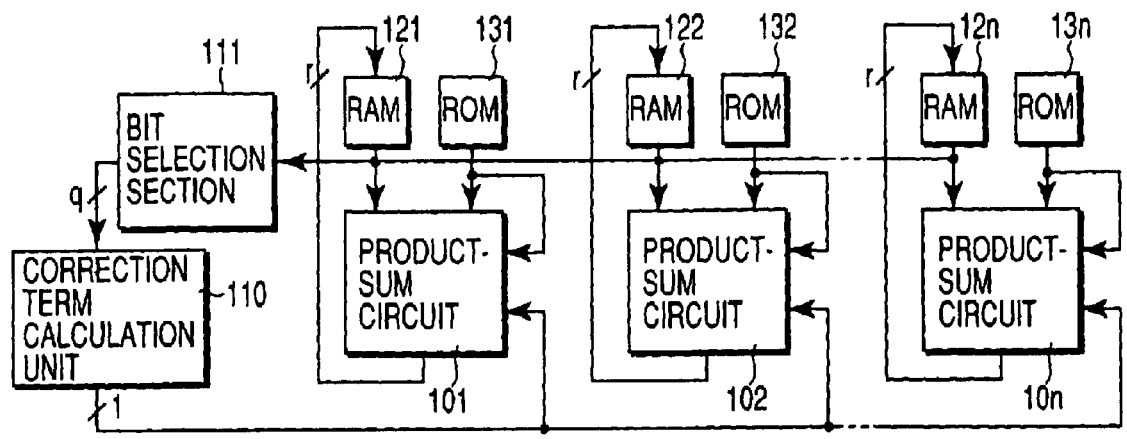
FIG. 1 is a block diagram showing the arrangement of a modular arithmetic apparatus according to the first embodiment of the present invention.

The embodiments of the present invention will be described below in detail with reference to the accompanying drawing.

First Embodiment

First, the arithmetic operation for RSA cryptography as the most appropriate example of the present invention will be described.

Encryption and decryption of RSA cryptography are realized by a power modular arithmetic operation given by $$C = m^e \bmod N \tag{1}$$

Since m and N has a size of several hundred decimal digits, and the processing amount is very large, various schemes have been proposed for efficient calculation.

A well-known method of implementing the RSA cryptography arithmetic operation is a method proposed by Montgomery in which a multiplication with a residue (to be referred to as a Montgomery multiplication hereinafter) is repeatedly used. As described in the prior art, a case wherein the Montgomery multiplication is executed using the residue number system will be described as one of detailed application targets of the present invention. First, the processing procedure of normal Montgomery multiplication without using the residue number system will be described.

The Montgomery multiplication is an algorithm for outputting $xyB^{-1} \bmod N$ or $xyB^{-1} \bmod N+N$ for input integers x, y, and N and comprises the following five steps.

(1) $S \leftarrow x \cdot y$
(2) $t \leftarrow \{s \cdot (-N)^{-1}\} \bmod B$
(3) $u \leftarrow t \cdot N$
(4) $v \leftarrow s + u$
(5) $w \leftarrow v/B$ where s, t, u, v, and w are intermediate variables, and B is an arbitrary integer larger than N and prime to N.

An idea for realizing this using the residue number system has been proposed by Posch et al. for the first time and represented by the following seven steps.

(1) $s_A \leftarrow x_A \cdot y_A$, $s_B \leftarrow x_B \cdot y_B$ (2) $t_B \leftarrow \{s_B \cdot (-N_B)^{-1}\} \bmod B$ (3) $t_A$ is obtained from $t_B$ by base conversion (4) $u_A \leftarrow t_A \cdot N_A$ (5) $v_A \leftarrow s_A + u_A$ (6) $w_A \leftarrow v_A B_A^{-1}$ (7) $w_B$ is obtained from $w_A$ by base conversion A symbol with a suffix A or B represents a number expressed by a base $A=\{a_1, a_2, \ldots, a_n\}$ or base $B=\{b_1, b_2, \ldots, b_n\}$ of the residue number system. For example, $x_A$ represents a set of n residues $\{x_1, x_2, \ldots, x_n\}$ obtained by dividing an element x of a residue ring modulo a product $A=a_1 a_2 \ldots a_n$ of the base elements by the respective elements of the base A. For accurate calculation by the above processing, at least N<A and N<B are necessary conditions. From these conditions, x or y can be uniquely expressed only by the base A or B. It is redundant to express x by the pair of $x_A$ and $x_B$. However, a product s of x and y takes a value within the range of $0 \leq s < N^2$ and cannot be accurately expressed without using A*B as a base. As is apparent from this fact, when s is expressed using A*B as a base, it can be accurately calculated as the product of the residue number system. The bases A and B generally have different sizes n and m, respectively. When n=m in a specific case, an arithmetic unit can be shared for processing of the base A and processing of the base B.

Excluding steps (3) and (7) in the Montgomery multiplication processing using the residue number system will clarify the correspondence between the steps and the five steps of the normal Montgomery multiplication. Steps (1) and (2) and steps (4) to (6) can easily be realized by a multiplication or addition of the residue number systems. For example, $s_A$ in step (1) can be calculated by multiplying each element of x represented by the residue number system of the base A by each element of y modulo corresponding base elements. For base conversion in steps (3) and (7), several studies have been done conventionally. How to efficiently execute base conversion is an important point for efficient implementation of the above processing algorithm.

A method of expressing given x as a very positive value equal to or smaller than the product $A (=a_1 a_2 \ldots a_n)$ of the base elements will be examined first. Assume that x is an integer within $0 \leq x < A$, and its residue number system representation is $\{x_1, x_2, \ldots, x_n\}$. The following equation holds on the basis of the well-known Chinese remainder theorem.

$$x = \sum_{i=1}^{n} x_i * (A_i^{-1} \bmod a_i) * A_i \bmod A \quad (2)$$

$$= \sum_{i=1}^{n} (x_i * A_i^{-1} \bmod a_i) * A_i \bmod A$$

where $A_i$ is $A/a_i$, and $A_i^{-1}$ is the multiplication inverse element of $A_I$ in modulo $a_i$. At this time, a value k which satisfies $$x = \sum_{i=1}^{n} (x_i * A_i^{-1} \bmod a_i) * A_i - kA \quad (3)$$

is present. Assume that the unknown parameter is only k, and k is expressed using a known parameter. The value k is a parameter for converting the value calculated in the first term into an integer from 0 (inclusive) to A (exclusive) and will be referred to as a correction term hereinafter. When the left- and right-hand sides of equation (3) are divided by A, we obtain $$x/A = \sum_{i=1}^{n} (x_i * A_i^{-1} \bmod a_i)/a_i - k \quad (4)$$

Hence, $$k = \sum_{i=1}^{n} (x_i * A_i^{-1} \bmod a_i)/a_i - x/A \quad (5)$$

Taking $0 \leq x/A < 1$ into consideration, $$k \leq \sum_{i=1}^{n} (x_i * A_i^{-1} \bmod a_i)/a_i < k+1 \quad (6)$$

Operation of rounding down the decimal portion is represented by [ ], the following relation can be derived from equation (6)

$$k = \left[ \sum_{i=1}^{n} (x_i A_i^{-1} \bmod a_i)/a_i \right] \quad (7)$$

It is similar to expression by Posch et al., through a correction term k' by their scheme is given by $$k' = \left[ \sum_{i=1}^{n} x_i * (A_i^{-1} \bmod a_i)/a_i \right] \quad (8)$$

Equation (7) of the present invention is different from equation (8) of Posch et al. in that the term of $x_i$ is parenthesized and multiplied by $A_i^{-1}$ modulo $a_i$. This product will be represented by $\xi_i$ hereinafter.

$$\xi_i = x_i * A_i^{-1} \bmod a_i \quad (9)$$

The value that the correction term k can take on the basis of equation (7) is from 0 (inclusive) to n (exclusive), while the correction term k' based on equation (8) of Posch et al. corresponds to about $\Sigma_{i=1}^{n} a_i$ at maximum. The correction term k' of Posch et al. satisfies $$n * \mathrm{Min}(a_i) \leq \sum_{i=1}^{n} a_i \leq n * \mathrm{Max}(a_i) \quad (10)$$

and largely exceeds n in many cases. Note that Min and Max are functions taking the minimum value and maximum value, respectively.

The correction term k calculated according to equation (7) has a value smaller than that obtained by the scheme of Posch et al. As described above, the calculation method of the correction term k according to the present invention uses equation (7) as the starting point.

The arrangement of a modular arithmetic circuit for realizing the Montgomery multiplication according to the present invention will be described with reference to the accompanying drawing.

FIG. 1 is a block diagram showing the main part of a modular arithmetic apparatus for realizing the Montgomery multiplication. A product-sum circuit 101 with a modular arithmetic function, RAM 121, and ROM 131 constitute one unit. N units having the same arrangement are parallelly arrayed. Each unit corresponds to each of the n base elements of the base A and each of the n base elements of the base B. For example, the product-sum circuit 101 executes an arithmetic operation corresponding to bases $a_1$ and $b_1$. Each of the n units is designed to execute an arithmetic operation of r bits. These units are connected to each other through an r-bit bus. A bit selection section 111 and correction term calculation unit 110 are illustrated as components other than the n units. The correction term calculation unit 110 is necessary to calculate a value corresponding to the correction term k in accordance with the above-described equation (7) or a modification thereof. The bit selection section 111 extracts a necessary number of upper bits (q) from the r-bit bus. Depending on implementation, the r bits may be directly supplied to the correction term calculation unit 110.

Figure 2:
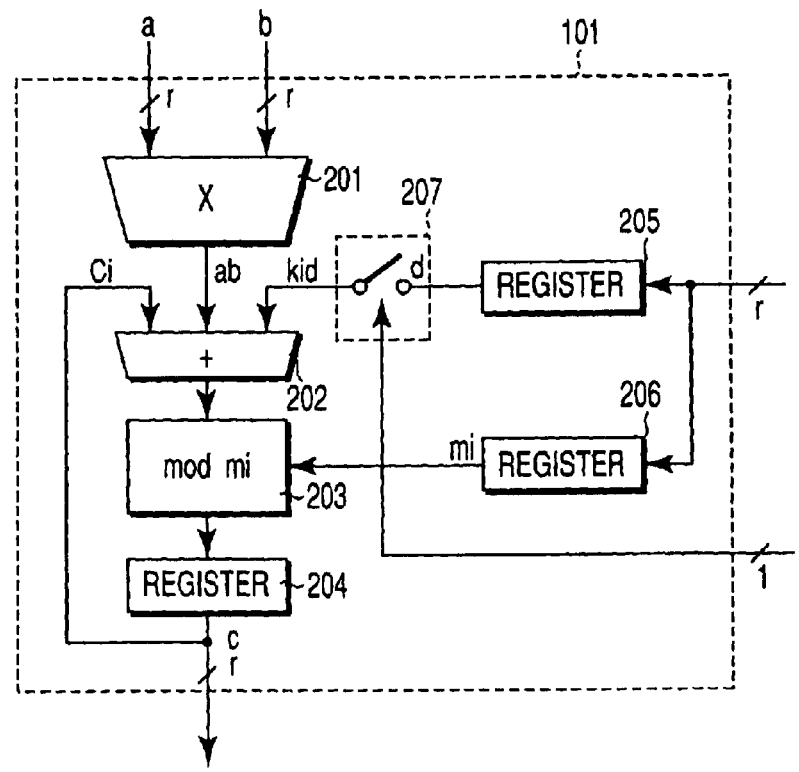
FIG. 2 is a block diagram showing the arrangement of a product-sum circuit shown in FIG. 1.

FIG. 2 is a block diagram showing the arrangement of one of the product-sum circuits 101 to 10n shown in FIG. 1. A structure related to the unit represented by the product-sum circuit 101 will be described here for the descriptive convenience. Inputs are r-bit data represented by a and b, an r-bit data input from the ROM 131, which is input from the right side in FIG. 2, and a 1-bit output from the correction term calculation unit. Referring to FIG. 2, the data a is the input from the RAM 121, and the data b is the input from the ROM 131. The data a and b are multiplied by a multiplier 201, and the result is supplied to an adder 202 on the output side. The adder 202 receives and adds a feedback value from a register 204 and data from a register 205 as well as the multiplication result. When a switch 207 is closed, the data from the register 205 is directly supplied to the adder 202. However, when the switch 207 is open, the data is replaced with 0. The switch 207 is ON/OFF-controlled by the 1-bit data from the correction term calculation unit 110. When the data is 1, the switch 207 is closed. When the data is 0, the switch 207 is opened. The result from the adder 202 is supplied to a modular arithmetic section 203 and converted into a residue by division by the value set in a register 206. The value of the register 206 is denoted by $m_i$ which represents the base $a_1$ or $b_1$. N data sets equal to the base size are supplied to the inputs a and b. After all the n data are calculated, the calculation result is complete in the register 204. It is supplied to the RAM 121 through the r-bit bus.

Figure 3:
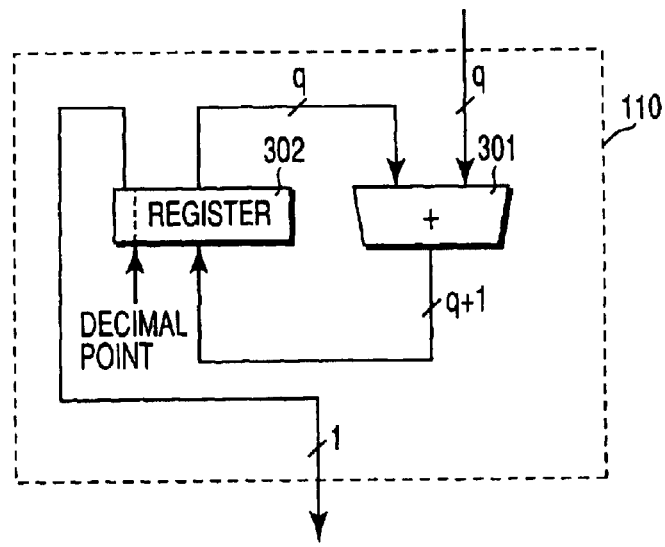
FIG. 3 is a block diagram showing an arrangement of a correction term calculation unit shown in FIG. 1.

FIG. 3 shows an arrangement of the correction term calculation unit 110. This correction term calculation unit 110 cumulatively adds input q-bit data by an adder 301. The sum of (q+1) bits is stored in a register 302. The most significant bit of the register 302 is output as the sequential calculation result of correction terms. Q bits other than the most significant bit are supplied to the adder 301 again in the next processing step. Since n values equal to the base size are supplied as inputs, the correction term calculation unit 110 outputs a calculation result n times.

Figure 4:
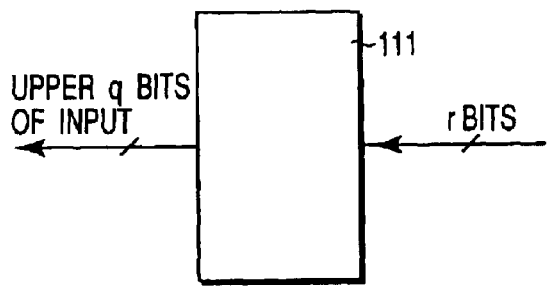
FIG. 4 is a view showing a bit selection section shown in FIG. 1.

FIG. 4 is a view showing the arrangement of the bit selection section 111. Of the input r bits, upper q bits (q≦r) are output. When q=r, the bit selection section can be omitted.

Figure 7:
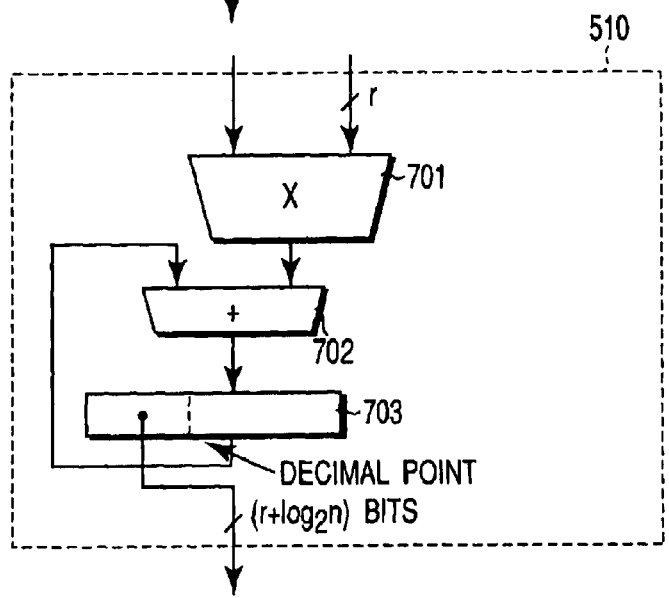
FIG. 7 is a block diagram showing the arrangement of a correction term calculation unit of the prior art shown in FIG. 5.
Figure 8:
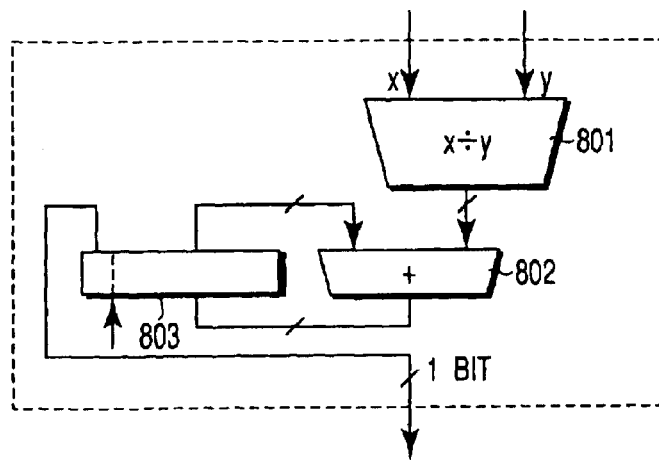
FIG. 8 is a block diagram showing the arrangement of the correction term calculation unit according to the first embodiment of the present invention.

FIG. 8 is a block diagram showing another arrangement of the correction term calculation unit 110. As a characteristic feature of this arrangement, the input value is divided by a division circuit 801 first. The division circuit 801 appears to be less advantageous than the arrangement shown in FIG. 7. However, a means for executing efficient division when the divisor is a power of 2 or very close to a power of 2 is known. Hence, the processing amount in the division circuit 801 is not always large.

As a characteristic feature of the modular arithmetic apparatus according to the first embodiment of the present invention, a procedure of calculating the correction term in accordance with equation (7) will be described. This embodiment assumes a circuit arrangement with q=r in FIG. 1. In this embodiment, the correction term calculation unit arrangement shown in FIG. 8 is used. In the arrangement shown in FIG. 8, a division is performed in obtaining the correction term. It is advantageous because the correct correction term k can be calculated for an arbitrary x smaller than the product A of base elements. Generally, the accuracy and labor of division pose a problem. However, when a special value such as $2^r$, $2^r-1$, or $2^r+1$ is used as a base, the correction term can easily be calculated by this method.

The flow until x expressed by the base A is converted into an expression using the base B will be described.

$$k = \left[\sum_{i=1}^{n}(x_i * A_i^{-1} \bmod a_i)/a_i\right] \quad (11)$$

$$= \left[\sum_{i=1}^{n}\xi_i/a_i\right]$$

To realize the calculation based on equation (11) as hardware, a procedure represented by the following recurrence formulas is used $$\sigma_i = (\sigma_{i-1} - k_{i-1}) + \xi_i/a_i \quad (12)$$

$$k_i = [\sigma_i] \quad (13)$$

$$c_j = \{c_{j-1} + \xi_i*(A_i \bmod b_j) + k_i*(b_j - A \bmod b_j)\} \bmod b_j \quad (14)$$

The procedure based on equations (12) to (14) is sequentially repeated from i=1 to n for all base elements $b_j$ (j=1, . . . , m) as conversion destinations.

Assuming that the initial value of each variable is $\sigma_0 = k_0 = c_0 = 0$, $c_n$ is the base conversion result. As is apparent, when the procedure is represented by the recurrence formulas, the correction term k is calculated bit by bit and reflected to the intermediate result of base conversion, as indicated by equation (14).

The hardware arrangement for sequentially calculating the correction terms k on the basis of equation (12) is the correction term calculation unit 110 shown in FIG. 8, which has already been described. In equation (11), $\xi_i$ corresponds to the input x shown in FIG. 8, and $a_i$ corresponds to the input y.

An adder 802 adds the quotient (x/y) output from the division circuit 801 and the previous value held by a register 803 and outputs the sum to the register 803. As shown in FIG. 8, when a carry has occurred in the register 803, the carry bit (1 bit) is output from the correction term calculation unit 110 as the correction term k (reduction factor). The correction term k takes a value 1 or 0.

The hardware arrangement for parallelly calculating the values after base conversion in accordance with equation (14) on the basis of the correction term k output from the correction term calculation unit 110 is made up of the product-sum circuits 101 to 10n shown in FIG. 2, which have already been described above. One of the product-sum circuits, e.g., the product-sum circuit 101 is designed to support the following basic arithmetic operation.

$$c_{i+1} = (c_i + ab + k_i d) \bmod m_i \quad (15)$$

Figure 5:
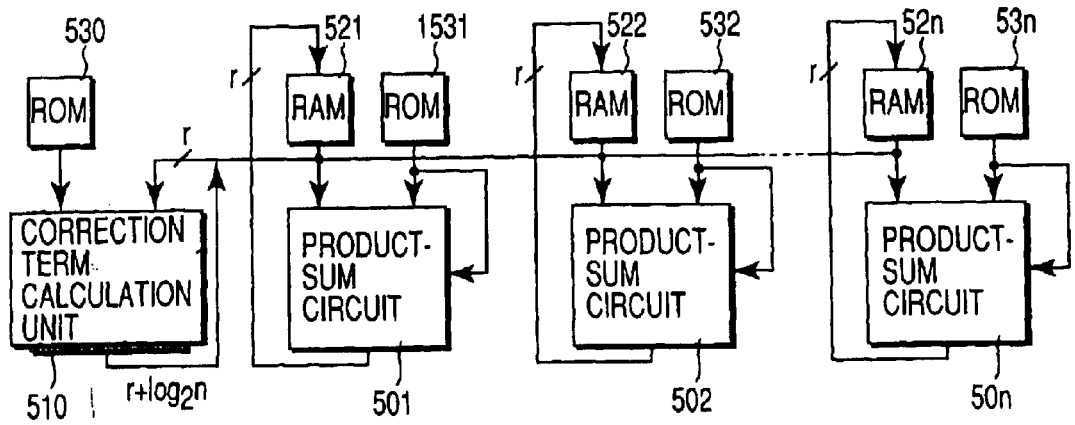
FIG. 5 is a block diagram showing the arrangement of a conventional modular arithmetic apparatus.
Figure 6:
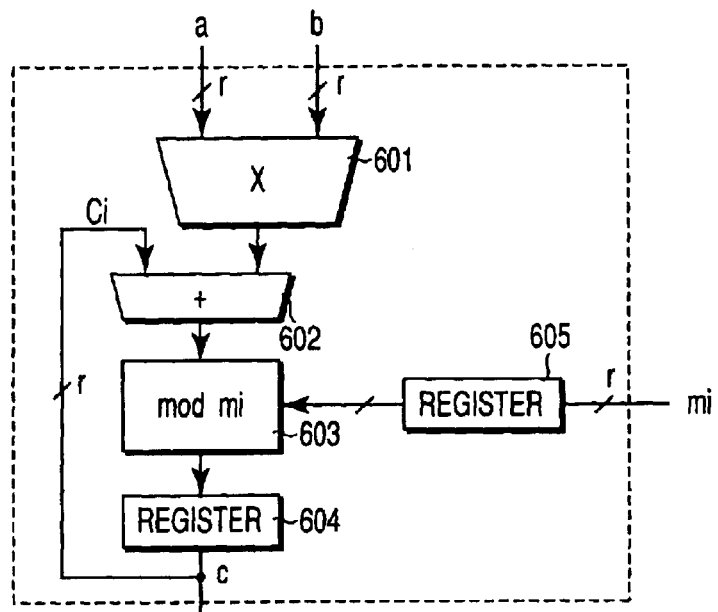
FIG. 6 is a block diagram showing the arrangement of a product-sum circuit of the prior art shown in FIG. 5.

In equation (15), since $k_i$ on the right-hand side is 1 or 0, the calculation of the third term of the right-hand side is realized only by the switch 207. This means that a 1-bit connection suffices for feedback from the correction term calculation unit 110 shown in FIG. 1 to the product-sum circuits 101 to 10n. The circuit arrangement of this embodiment is much simpler than the circuit of the Posch et al. shown in FIG. 5. The structural advantage that 1 bit suffices for feedback also applies to other embodiments to be described later.

In the above procedure, in calculating the correction term, $x_i$ must be multiplied by $A_i^{-1}$ to obtain $\xi_i$ first. However, when this base conversion is used for the Montgomery multiplication using the residue number system, additional labor for obtaining $\xi_i$ can be omitted by multiplying each element of the constant $(-N_B^{-1})$ by $A_i^{-1}$ in advance in step (2). In addition, pre-processing necessary for conversion in step (7) can be incorporated in the constant $B_A^{-1}$ in step (6). This also applies to other embodiments to be described later.

The above procedure can be applied not only to base conversion but also to base extension. More specifically, when conversion is executed not for all the m bases $\{b_j\}$ but for only a specific base, base extension can be executed.

According to the new base conversion (extension) of the present invention, which is applied to the above-described modular arithmetic apparatus of the first embodiment, the following functions/effects can be obtained.

(a) The value of the correction term can be made relatively small, and the correction term can be sequentially processed in units of bits.

(b) Since the value after conversion is the same as that expressed before conversion, no error occurs, unlike the scheme of Posch et al.

(c) Even if an error occurs, it can easily be controlled by pre- and post-processing or limitation on the input size.

(d) In an application to RSA cryptography, limitations on the key size are small.

(e) No multiplication is required to calculate the correction term, and the processing efficiency is high.

(f) The manner bases are set is not so constrained, and the versatility is high.

Hence, according to base conversion (extension) of this embodiment, the Montgomery multiplication can be executed at a high speed by a simple arrangement, and high-speed processing of RSA cryptography can be realized.

The modular arithmetic apparatus of this embodiment can also be applied to a procedure of converting residue number system representation into radix representation. This procedure will be described in detail in the second embodiment.

Second Embodiment

In the second embodiment, in equation (11) for calculating a correction term k, as the denominator of each term of the right-hand side, a power of 2 which is equal to or larger than the denominator and closest to the denominator is selected, thereby executing approximation.

That is, $r_i$ satisfying $$2^{r_i-1} < a_i \leq 2^{r_i} \tag{16}$$

is used to approximate $a_i$ by $2^{r_i}$. Generally, $r_i$ changes in units of base elements. In implementation, however, when all base elements have the same bit length, product-sum circuits 101 to 10n shown in FIG. 1 can be shared.

For an appropriate $\mu_i$, $a_i$ is given by $$a_i = 2^{r_i} - \mu_i \tag{17}$$

At this time, as an approximate value l of the correction term k calculated by equation (11), $$l = \left[\sum_{i=1}^{n} \xi_i / 2^{r_i}\right] \tag{18}$$

is used. When the value l is sequentially calculated using recurrence formulas, like the correction term k, we obtain $$\sigma_i = (\sigma_{i-1} - l_{i-1}) + \xi_i / 2^{r_i} \tag{19}$$

$$l_i = [\sigma_i] \tag{20}$$

The initial values of l and $\sigma$ are 0. The correction term can be calculated according to equations (19) and (20). This embodiment also assumes a circuit arrangement with q=r in FIG. 1, as in the first embodiment. In this embodiment, the correction term calculation unit arrangement shown in FIG. 3 is used.

Correction term calculation according to equations (19) and (20) can be used for base conversion and base extension, as in the first embodiment. In this embodiment, however, it is applied to a procedure of converting residue number system representation into radix representation. Equation (21) represents the procedure of converting residue number system representation into radix representation.

$$c_i = c_{i-1} + \xi_i * A_i - l_i * A \tag{21}$$

Note that although equation (21) is similar to equation (14), the variable $c_i$ in equation (14) need only have an accuracy capable of expressing the maximum base, while the variable $c_i$ in equation (21) assumes that a multiple-length variable as large as the product A of base elements can be stored. In actual hardware design, the calculation of equation (21) need be appropriately divided into repeated single-precision calculations instead of directly realizing the calculation. This suffices as a description of the principle of conversion from residue number system representation to radix representation. Decomposition into single-precision calculations is easy.

When the correction term k is approximated in accordance with equation (18), an error may occur in the conversion result of equation (21). The error will be briefly described here. First, E given by the following equation is introduced as the scale of approximation error.

$$\epsilon = \text{Max}(\mu_i / 2^{r_i}) \tag{22}$$

When $\epsilon$ is used, when the input x is $$n\epsilon A \leq x < A \tag{23}$$

equation (17) gives the same value as the correct correction term k. In addition, when $$0 \leq x < n\epsilon A \tag{24}$$

equation (17) gives the correct value k or k−1.

According to equation (23), it is required to satisfy $n\epsilon < 1$ and select small $\epsilon$ only if necessary. On the other hand, it is known that when sufficiently small $\mu_i$ is selected, mod $a_i$ calculation executed by a modular arithmetic section 203 shown in FIG. 2 becomes easy.

According to the second embodiment described above, the procedure of converting residue number system representation into radix representation can be realized by the modular arithmetic apparatus for calculating the correction term l at a high speed with a simple arrangement, as in the first embodiment.

In the second embodiment, the denominator in equation (12) is approximated by a power of 2. However, in equation (12), approximation may be done not only for the denominator but also for the numerator. More specifically, the effective bit length of the numerator may be shortened within the allowable error range, as will be described in the third embodiment.

Third Embodiment

In the third embodiment, the effective bit length of the numerator in equation (12) is shortened within the allowable error range, thereby doing approximation. This approximation corresponds to setting q<r in FIG. 1 and cumulatively adding upper q bits of r bits by the correction term calculation unit.

In this case, a correction term m is given by, e.g., $$m = \left[\sum_{i=1}^{n} trunc(\xi_i)/2^{ri}\right] \quad (25)$$

where trunc( ) is a function for nullifying bits lower than the upper q bits of a given variable but not the upper bits. In principle, although the number q of bits to be extracted may be changed in units of terms, the hardware arrangement is normally simplified by using common q for all terms.

The correction terms m are sequentially calculated by the following recurrence formulas.

$$\sigma_i = (\sigma_{i-1} - m_{i-1}) + trunc(\epsilon_i)/2^{ri} \quad (26)$$

$$m_i = [\sigma_i] \quad (27)$$

The initial values of σ and m are 0.

In this embodiment, an approximation error occurs not only for the denominator but also for the numerator. The influence of approximation errors in the denominator and numerator will be described. As the measure of approximation error in the numerator, $\delta_i$ given by the following equation is introduced.

$$\delta_i = \{\xi_i - trunc(\xi_i)\}/a_i \quad (28)$$

In addition, $$\delta = Max(\delta_i) \quad (29)$$

is defined.

When δ is introduced, the following conditions as in the second embodiment are given.

When an input x is $$n(\epsilon+\delta)A \leq x < A \quad (30)$$

equation (25) gives the same value as the correct correction term k. In addition, when $$0 \leq x < n(\epsilon+\delta)A \quad (31)$$

equation (25) gives the correct value k or k−1.

According to the third embodiment, since approximation is done by shortening the effective bit length within the allowable error range not only for the denominator in equation (12) but also for the numerator, correction term calculation can be made simpler and faster.

As a characteristic of the correction terms 1 and m given by the second and third embodiments, when the input x has a value equal to or larger than a predetermined value, a correct correction term is given, but when the input x is smaller than the predetermined value, no correct correction term is given.

In some cases, however, a characteristic is more preferable in which only when x is equal to or larger than the predetermined value, the correction term contains an error, and if x is smaller than the predetermined value, a correct correction term is given up to an arbitrary small value. For example, in conversion from the base A to the base B in step (7) of the above Montgomery multiplication, accurate base conversion is always executed only by setting the modulus N to a predetermined value or less.

Fourth Embodiment

As the fourth embodiment, a method of calculating a correction term such that a correct correction term is given up to an arbitrary small value when x is smaller than a predetermined value will be described.

The fundamental principle of correction term calculation is based on equation (11). Approximation using a power of 2 for the denominator and only upper q bits for the numerator is used. In this scheme, parameters α and β are introduced. The parameter α limits the magnitude of the input x, as represented by $$0 \leq x < (1-\alpha)A \quad (32)$$

In this embodiment, a correction term m' is calculated by $$m' = \left[\beta + \sum_{i=1}^{n} trunc(\xi_i)/2^{ri}\right] \quad (33)$$

In this embodiment, q<r is set in FIG. 1, the upper q bits of the r bits are input to a correction term calculation unit 110 (FIG. 3) and cumulatively added while setting the initial value of an internal register 302 to β. Recurrence formulas corresponding to equation (33) are $$\sigma_0 = \beta \quad (34)$$

$$m'_0 = 0 \quad (35)$$

$$\sigma_i = (\sigma_{i-1} - m'_{i-1}) + trunc(\epsilon_i)/2^{ri} \quad (36)$$

$$m'_i = [\sigma_i] \quad (37)$$

When $n(\epsilon+\delta) \leq \beta \leq \alpha 1$, x which satisfies $0 \leq x \leq (1-\alpha)A$ is correctly converted.

For example, when α=β=1/2, a correct correction term can always be calculated for an arbitrary input x equal to or smaller than A/2. To realize β=1/2 by the modular arithmetic apparatus shown in FIG. 1, 1 is set to the second upper bit of the register 302 shown in FIG. 3. When β is set to the reciprocal of a power of 2, setting the initial value of the register is facilitated because a corresponding bit need only be set to 1. Generally, for β from the error n(ε+δ) to α, an arbitrary value can be set as an offset.

According to the fourth embodiment, the parameters α and β are introduced, and the input x is limited to a predetermined value or less, as described above. Thus, correction term calculation for always giving a correct correction term for an arbitrary small value of the limited input x can be realized.

Fifth Embodiment

The fifth embodiment is related to the parameter size. For RSA cryptography, a modulus size of about 1,024 bits must be selected, and both bases A and B require a size slightly larger than 1,024 bits. When each of the bases A and B has a size of 32 bits, i.e., r=32, the base size is n=33. This is because n*r need be about 1,024. In the fourth embodiment, when α=β=1/2, n(ε+δ)≤1/2 must hold to suppress an error. Hence, ε+δ≤1/2n=1/66, and ε<1/2⁸ and ε<1/2⁸ are sufficient conditions. Such a parameter size almost corresponds to the accuracy of an adder 301 shown in FIG. 3. As is apparent from the above fact, an almost 8-bit adder is used for correction term calculation.

Sixth Embodiment

The sixth embodiment is related to an apparatus for executing power reside arithmetic operation on the basis of the Montgomery multiplication by base conversion (extension) according to the present invention described above.

Figure 9:
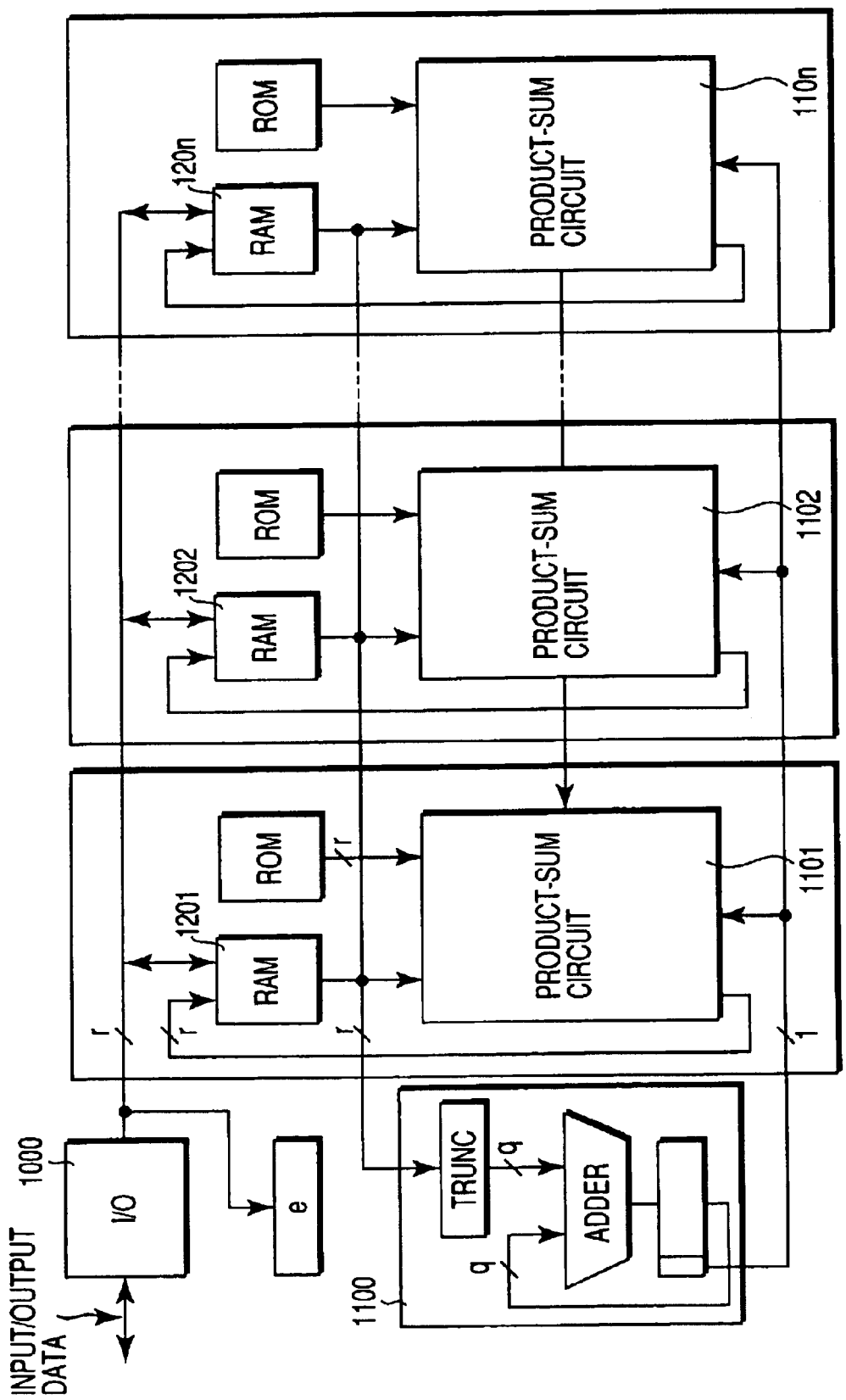
FIG. 9 is a block diagram showing the arrangement of a power modular arithmetic apparatus according to the sixth embodiment of the present invention.

FIG. 9 is a block diagram showing the overall arrangement of a power modular arithmetic apparatus according to this embodiment. Input data and output data are exchanged through an I/O section 1000 shown in FIG. 9. Input data is stored in a predetermined RAM 1201 through the I/O section 1000. When external data are input by residue number system representation, the data are stored in the corresponding RAMs 1201 to 120n, respectively. Referring to FIG. 9, n RAMs are illustrated. Elements corresponding to bases $a_i$ and $b_i$ are written in the respective RAMs.

The input data are given as power modular arithmetic results by repeating the above-described Montgomery multiplication by product-sum circuits 1101 to 110n and correction calculation unit 1100. The arithmetic results are stored in the corresponding RAMs 1201 to 120n and externally output through the I/O section 1000.

Figure 10:
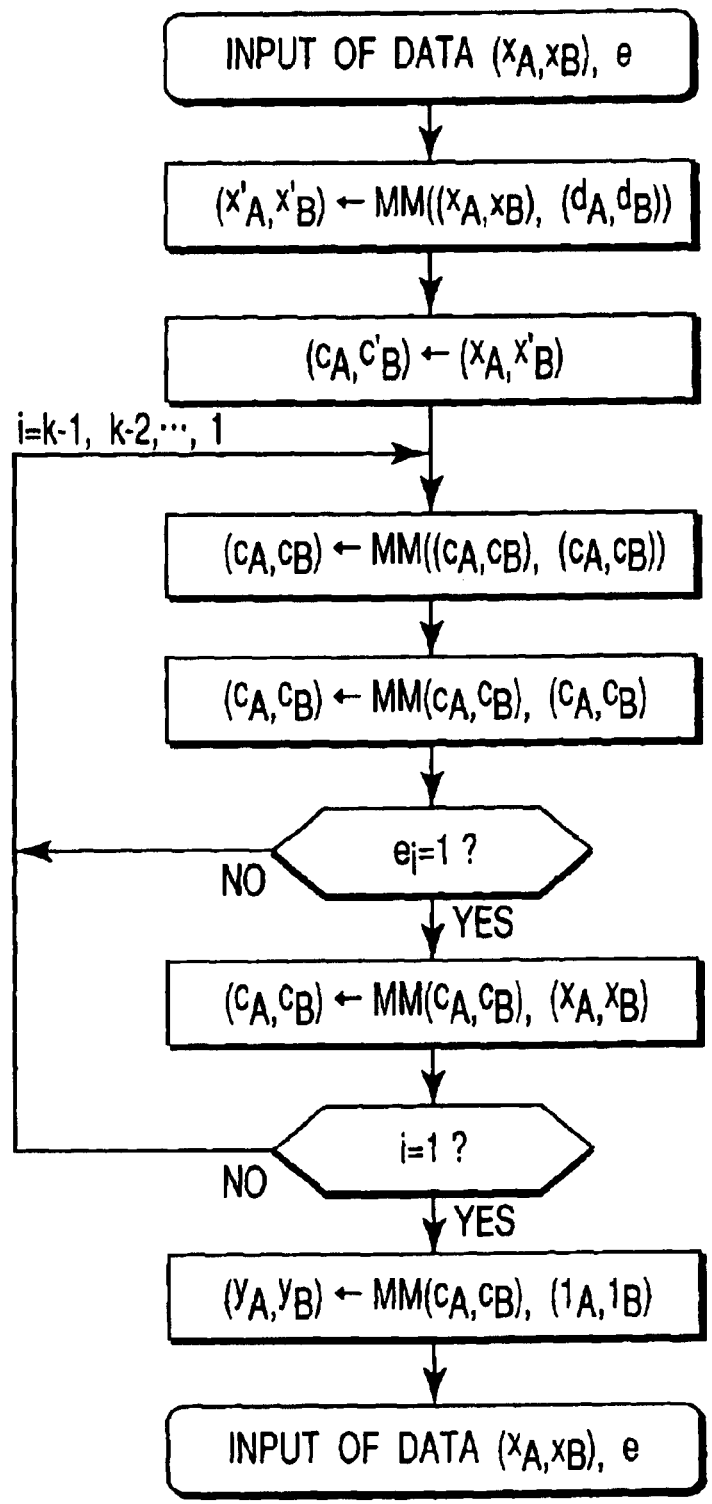
FIG. 10 is a flow chart showing power modular arithmetic processing according to the sixth embodiment of the present invention.

A procedure of executing power modular arithmetic operation by repeating the Montgomery multiplication will be described with reference to the flow chart shown in FIG. 10. The flow chart shown in FIG. 10 represents processing of calculating the eth power of an input value x represented by a residue number system and dividing the result by N to obtain the residue. Assume that N is a known value. Assuming that the residue number system representation of N is calculated in advance, processing therefor is not illustrated. The value N may be externally input, and processing of obtaining the residue number system representation of N may be executed every time the value N is input.

MM shown in FIG. 10 is a function which means the Montgomery multiplication by the residue number system arithmetic operation. The residue number system representation of the input x is multiplied by a value $(d_A, d_B)$ representing a constant d by the residue number system, and converted into x'. In this case, $d=B^2 \mod N$. Next, the (residue number system representation of the) converted value x' is copied to an intermediate result c.

The next step is loop processing. A loop variable i changes from k−1 to 1. An externally input exponent e is a binary representation. The number of bits is k, and each bit is represented by $e_i$. The most significant bit is $e_k=1$, and $k \geq 2$.

In the loop, a value corresponding to the second power of the intermediate variable c is calculated using the Montgomery multiplication. Subsequently, it is determined whether the bit $e_i$ of e corresponding to the loop variable i is 1. If it is not 1, the flow returns to the start of the loop. If it is 1, the flow advances to the next step. In the next step, the product of c and x is obtained by the Montgomery multiplication. Subsequently, it is determined whether the loop variable i is 1. If it is not 1, the flow returns to the start of the loop. If it is 1, the loop processing is ended.

In the final step, the product of the previous calculation result c and a value obtained by representing 1 by the residue number system is obtained by the Montgomery multiplication to obtain (the residue number system representation of) a result y.

Thus, $y=x^e \mod N$ is calculated.

Seventh Embodiment

The seventh embodiment is related to a modular arithmetic apparatus having a ring structure.

Referring to FIG. 1, the n product-sum circuits are connected through the r-bit bus. This bus connection makes it possible to transmit data output from a given RAM to all of the n product-sum units for parallel processing. This structure in which the product-sum circuits are connected through a bus is one of effective implementations for realizing parallel processing.

On the other hand, as is well known in the field of network architecture, ring connection is also available to connect a plurality of units in addition to such bus connection. The bus-type architecture is characterized by the bus for broadcasting the same data to n units, while in ring connection, a communication path for connecting units adjacent to each other connects n units to construct a ring-shaped architecture as a whole.

The modular arithmetic apparatus of the present invention can also be implemented by ring connection. In ring connection, each unit only need send data to the adjacent unit. For this reason, the data driving ability of each unit can be small as compared to the bus-type structure in which data must be transmitted to a plurality of units. In addition, the operations of all units can be controlled in the same way. To the contrary, in the bus connection, when a unit will broadcast data, the remaining (n−1) units receive the data, so all units do not execute the same operation. Since all units execute the same operation, the ring structure is easier to control.

Figure 11:
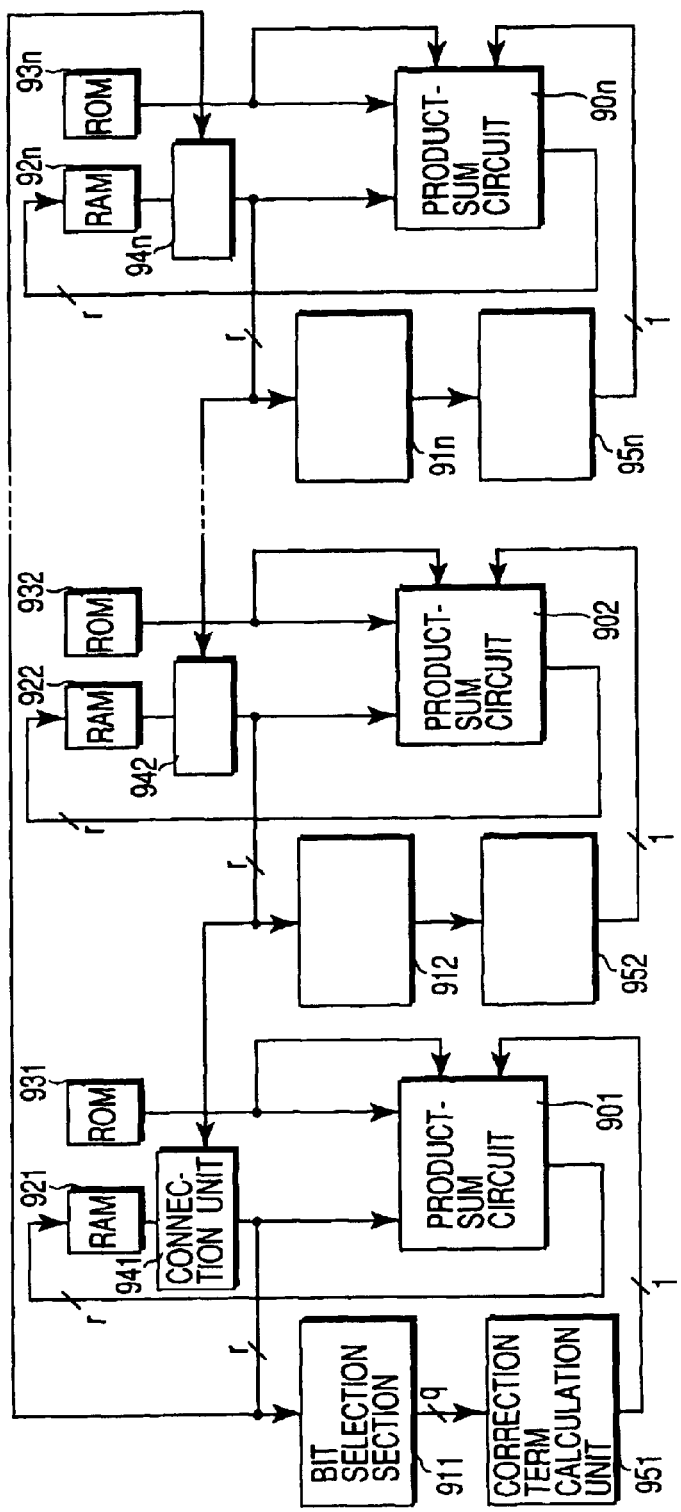
FIG. 11 is a block diagram showing the arrangement of the modular arithmetic apparatus according to the seventh embodiment of the present invention.

FIG. 11 is a block diagram showing the arrangement of a modular arithmetic apparatus having a ring structure. In the arrangement shown in FIG. 11, bus connection is changed to ring connection, and simultaneously, n bit selection sections 111 and n correction term calculation units 110 in FIG. 1 are prepared for n product-sum circuits, respectively. In the arrangement shown in FIG. 1, since only one correction term calculation unit is prepared for the n product-sum circuits, a 1-bit bus for broadcasting the correction term calculated by the correction term calculation unit to the n product-sum circuits is present. When the correction term calculation units are prepared for the respective units, the circuit scale slightly increases, though the correction term calculation unit of the present invention has the structure shown in FIG. 3, and its scale is small. For this reason, even in this arrangement with n correction term calculation units, the ratio of the correction term calculation units to the entire circuit amount is very low.

Figure 12:
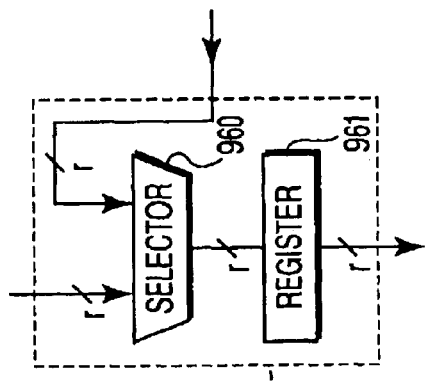
FIG. 12 is a block diagram showing the arrangement of the connection unit of the modular arithmetic apparatus shown in FIG. 11.

In the ring structure shown in FIG. 11, the correction term calculation units are prepared for the respective product-sum circuits, thereby eliminating the bus for transmitting a correction term to each product-sum arithmetic unit. FIG. 12 is a block diagram showing the connection unit section in FIG. 11 in more detail. The connection unit comprises a 2-input selector 960 and an r-bit register 961 for latching the selector output. In a certain product-sum circuit, one of operands to be used in the current arithmetic cycle is stored in the register 961. In the next arithmetic cycle, that operand is transferred to the adjacent connection unit on the left side. Simultaneously, the next operand is received from the adjacent connection unit on the right side. The n operands stored in the registers 961 of the n connection units are sequentially transferred to adjacent connection units by a relay. In time corresponding to n cycles, the n operands are circulated to all the units.

<Scalability of the Number of Units>

The above description has been done assuming that the number n of product-sum circuits (or the number n of units) equals the base size n. Generally, however, the number of arithmetic units and base size n need not always match. The number of units is represented by m. Under a constraint m≦n, higher-speed processing becomes possible as the number m becomes large. On the other hand, in considering hardware mounting for, e.g., LSIs, the circuit scale and power consumption increase as the number m becomes large, so a tradeoff for the arithmetic speed occurs. As a typical method of setting the number m, a measure of n can be employed. For example, when n=33, m=1, 3, 11, and 33 are candidates for the number of units. A value other than a measure of n may be employed as m. However, when a measure of n is employed, circuit control can be regular, and the operability of arithmetic units is high. In any case, when m is not limited to n, the degree of freedom in designing an LSI greatly increases, as can be easily estimated.

As has been described above, according to the present invention, new base conversion (extension) is provided, and the following functions/effects can be obtained.

(a) The value of the correction term can be made relatively small, and it can be sequentially processed in units of bits.

(b) Since the value after base conversion is the same as that expressed before conversion, no error occurs, unlike the scheme of Posch et al.

(c) Even if an error occurs, it can easily be controlled by pre- and post-processing or limitation on the input size.

(d) In an application to RSA cryptography, limitations on the key size are small.

(e) No multiplication is required to calculate the correction term, and the processing efficiency is high.

(f) The manner bases are set is not so constrained, and the versatility is high.

Hence, the speed of Montgomery multiplication can be increased with a simple arrangement, and the RSA cryptographic processing can be executed at a higher speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A modular arithmetic apparatus, comprising:

a plurality of product-sum circuits configured to receive a plurality of base elements and execute a modular arithmetic operation; and a correction term calculation unit configured to receive said plurality of base elements in parallel to said plurality of product-sum circuits and to calculate a sequence of bits of a correction term to be used in said modular arithmetic operation, wherein said correction term calculation unit sequentially calculates the correction term in units of bits, each bit from said sequence being fed to said modular arithmetic operation individually for a corresponding sequential calculation, and each of said product-sum circuits sequentially uses the correction term calculated by said correction term calculation unit and performs one of a base conversion operation or base extension operation.

2. An apparatus according to claim 1, wherein said product-sum circuit performs a Montgomery multiplication.

3. An apparatus according to claim 1, wherein each of said product-sum circuits sequentially reflects the correction term calculated by said correction term calculation unit and converts a residue number system representation into a radix representation.

4. An apparatus according to claim 1, wherein said correction term calculation unit comprises a division circuit, and a base of a residue number system processed by said product-sum circuit is approximated to a power of 2.

5. An apparatus according to claim 1, further comprising:

a bit selection section configured to select an upper bit of said plurality of base elements received by said correction term calculation unit.

6. An apparatus according to claim 1, further comprising:

an I/O section for inputting/outputting data to/from an external unit.

* * * * *